(12) United States Patent
Thompson et al.

(10) Patent No.: US 7,200,542 B1
(45) Date of Patent: *Apr. 3, 2007

(54) METHOD AND APPARATUS FOR BIASED IDENTIFICATION OF POTENTIAL DATA SHARING LOCATIONS

(75) Inventors: Ryan C. Thompson, Loveland, CO (US); John W. Maly, Laporte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

This patent is subject to a terminal disclaimer.

(21) Appl. No.: 10/371,382

(22) Filed: Feb. 21, 2003

(51) Int. Cl.
*G06F 17/50* (2006.01)

(52) U.S. Cl. .............................. 703/14; 703/13; 703/15; 703/20; 714/33; 714/718; 700/86

(58) Field of Classification Search .................. 703/13, 703/22; 717/125, 127; 700/86; 702/123, 702/187; 714/33, 718

See application file for complete search history.

(56) References Cited

U.S. PATENT DOCUMENTS

| | | | | |
|---|---|---|---|---|
| 5,673,272 A * | 9/1997 | Proskauer et al. | .......... | 714/724 |
| 5,774,358 A * | 6/1998 | Shrote | .......... | 700/86 |
| 5,924,098 A * | 7/1999 | Kluge | .......... | 707/100 |
| 5,953,530 A * | 9/1999 | Rishi et al. | .......... | 717/127 |
| 6,117,181 A * | 9/2000 | Dearth et al. | .......... | 703/22 |
| 6,170,018 B1 * | 1/2001 | Voll et al. | .......... | 719/330 |
| 6,247,121 B1 * | 6/2001 | Akkary et al. | .......... | 712/239 |
| 6,275,956 B1 * | 8/2001 | On et al. | .......... | 717/125 |
| 6,345,242 B1 * | 2/2002 | Dearth et al. | .......... | 703/22 |
| 6,804,631 B2 * | 10/2004 | Kelley et al. | .......... | 702/187 |
| 6,845,440 B2 * | 1/2005 | Thompson et al. | .......... | 711/220 |
| 7,000,233 B2 * | 2/2006 | Levitan et al. | .......... | 718/107 |
| 7,024,347 B2 * | 4/2006 | Watanabe et al. | .......... | 703/23 |
| 7,065,676 B1 * | 6/2006 | Lang et al. | .......... | 714/33 |
| 7,103,812 B1 * | 9/2006 | Thompson et al. | .......... | 714/718 |
| 2006/0058976 A1 * | 3/2006 | Ferris | .......... | 702/123 |

OTHER PUBLICATIONS

"AVPGEN—A Test Generator for Architecture Verification", Chandra et al, IEEE Transactions of VLSI Systems, vol. 3, No. 2, Jun. 1995.*

"Directions in Multiprocessor Verification", Logan, IEEE 0-7803-2492-7/95, 1995 IEEE.*

"Test Floor Verification on Multiprocessor hardware", Saha et al, IEEE 0-7803-3255-5/96, 1996, IEEE.*

* cited by examiner

*Primary Examiner*—Fred Ferris

(57) ABSTRACT

A method for identifying predictable data sharing locations includes generating a testcase thread of code, creating a list of data lines used by the generated testcase thread of code, and generating a list of predictable data sharing locations based on the data line list.

25 Claims, 6 Drawing Sheets

METHOD AND APPARATUS FOR BIASED IDENTIFICATION OF POTENTIAL DATA SHARING LOCATIONS

BACKGROUND

As technology continues to infiltrate everyday life, users are demanding increased speed and reliability of computerized equipment. In order to satisfy the demand for increased speed of computerized equipment, increasingly powerful and complex processors are being designed and manufactured. However, as the complexity of these processors increases, it becomes more difficult to verify their correct behavior. If a processor fails to function as intended, due to an error, the results could be catastrophic to a user.

In order to verify the behavior of a processor that is still in the developmental stage, developers often use a testcase generator. A testcase generator automatically generates a large number of testcases to be performed on a processor to test its functionality. A testcase is a text file that contains resource state initialization information and test instructions to be run on a simulator of a processor under development. When a testcase is run, the simulator of the processor's resources are initialized to the state specified in the testcase and the instructions specified are executed on the processor simulator being tested. Testcase instructions may include, but are in no way limited to, add, load, and store operations.

Typically, testcase generators randomly select parameters for each testcase in order to create a large number of testcases that cover a wide variety of instructions and test the various functionality of the processor under development. These testcases are run to exercise a processor's control paths more fully than typical program code, which for performance reasons, often deliberately avoids performing operations that it is known are difficult for a processor to perform.

Some testcase generators are able to further evaluate a processor under development by generating what are commonly known as "predictable" testcases. Predictable testcases occur when a testcase generator is able to predict the sequence of instructions and data that a processor will use while performing a testcase. When performing predictable testcases, the testcase generator predicts the final state of the processor resources. The predicted final state of the processor resources is then compared to the actual final state of the simulated processor under development to determine whether the correct results were achieved. If the predicted and the actual final states of the simulated processor under development differ, an error has occurred and the processor should be debugged either manually or automatically.

If a processor under development has the capability to simultaneously run multiple "threads" of code, a condition known as data sharing may occur. Data sharing occurs when two or more separate threads operate on the same "line" of data. A "line" of data is the smallest set of data that is loaded into cache in a particular processor. For example, a processor may have a data line size of 32-bytes. If a thread uses any byte of data on a particular 32-byte line, the entire 32-byte line will be loaded into cache of the processor. If a subsequent thread of code operates on the same line of data, both threads may access the cached data resulting in a data sharing situation.

SUMMARY

In one of many possible embodiments, the present invention provides a method for identifying predictable data sharing locations including generating a testcase thread of code, creating a list of data lines used by the generated testcase thread of code, and generating a list of predictable data sharing locations based on the created data line list.

Another embodiment of the present invention provides an apparatus capable of testing the correct behavior of an integrated circuit including a processor, a memory storage unit, and a bus communicatively coupling the processor and the memory storage unit, wherein the memory storage unit includes a machine readable medium having instructions thereon for causing the apparatus to identify predictable data sharing locations that may be used to test the data sharing capabilities of the integrated circuit.

BRIEF DESCRIPTION OF THE DRAWINGS

The accompanying drawings illustrate various embodiments of the present invention and are a part of the specification. The illustrated embodiments are merely examples and do not limit the scope of the invention.

Throughout the drawings, identical reference numbers designate similar, but not necessarily identical, elements.

DETAILED DESCRIPTION

The present specification describes systems and methods for identifying possible data locations for performing predictable data sharing operations by a testcase generator. According to one exemplary implementation, described more fully below, a testcase generator identifies possible data sharing locations based upon a number of predetermined biases. In the following description, for purposes of explanation, numerous specific details are set forth in order to provide a thorough understanding. It will be apparent, however, to one skilled in the art that the system and/or method described can be practiced without these specific details.

Reference in the specification to "one embodiment" or "an embodiment" means that a particular feature, structure, or characteristic described in connection with the embodiment is included in at least one embodiment of the invention. The appearance of the phrase "in one embodiment" in various places of the specification are not necessarily all referring to the same embodiment.

Exemplary Overall Structure

Figure 1:
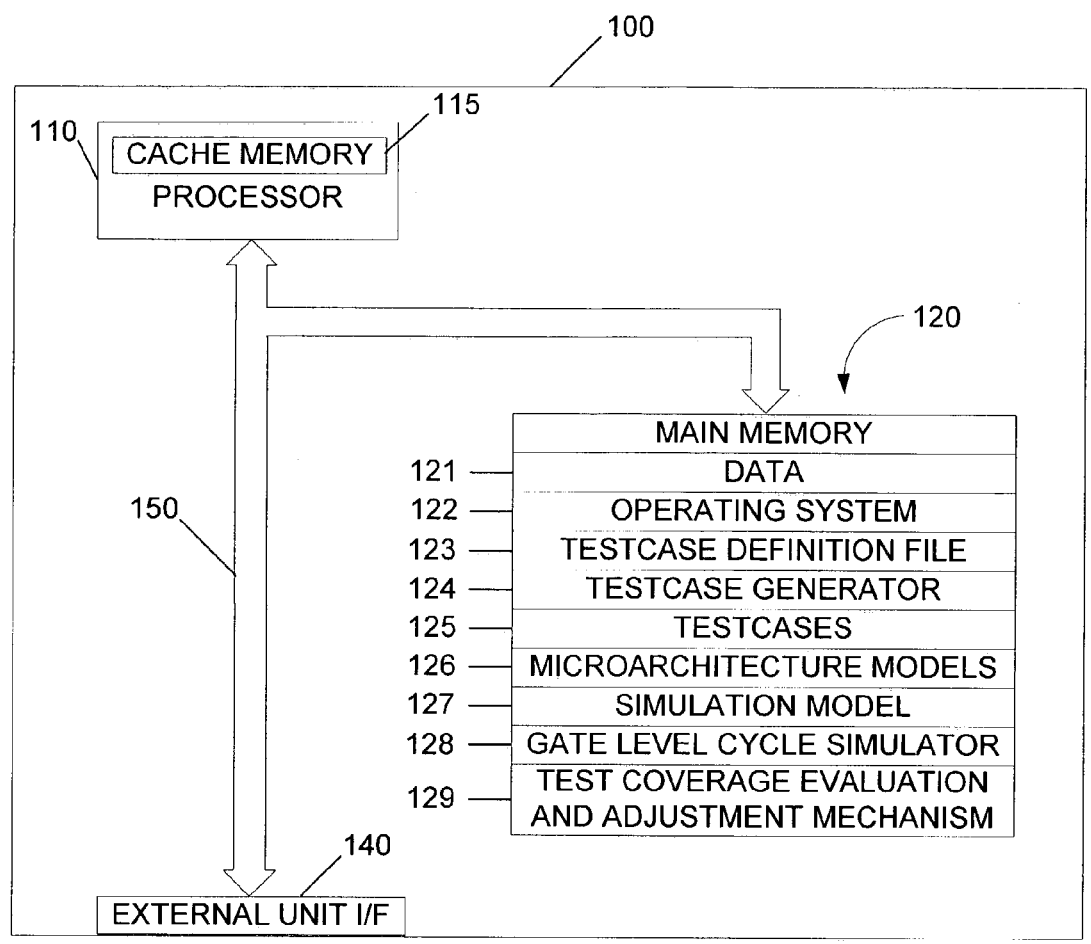
FIG. 1 illustrates the components of a computer system for testing multi-threaded processors according to one representative embodiment.

FIG. 1 illustrates one embodiment of a computer system (100) for testing the functionality of a processor under development. As shown in FIG. 1, the computer system (100) includes a processor (110) connected to a main memory (120) and an external unit interface (140). The computer system (100) of the present processor testing system may be any computer system capable of performing testcase generation and analysis, regardless of whether the computer system is a complicated multi-user computing apparatus, a single user workstation, or a personal computer. The system components (120, 140) are interconnected through the use of a system bus (150).

The external unit interface (140) illustrated in FIG. 1 may be used to connect terminals, network interfaces, mass storage devices such as a floppy disk drive, or any combination thereof to the computer system (100). The external unit interface (140) may include, but is in no way limited to parallel ports or universal serial bus (USB) ports.

The main memory (120) illustrated in FIG. 1 preferably includes data (121), an operating system (122), a testcase definition file (123), a testcase generator (124), testcases (125), one or more microarchitecture models (126), a simulation model (127), a gate level cycle simulator (128), and a test coverage evaluation and adjustment mechanism (129). While each individual component of the main memory (121–129) is shown to reside in the main memory (120), it is within the scope of the present processor testing system that the individual components of the main memory are not necessarily all completely contained in the main memory (120) at the same time. The term "memory" is used herein to generically refer to the entire virtual memory of the computer system (100).

The data (121) component of the main memory (120) represents any data that serves as input to or output from any program in the computer system (100). The operating system (122) illustrated in FIG. 1 is preferably a UNIX based multitasking operating system, however, the computer system may include any operating system capable of managing the resources of the computer system (100). Testcases (125) are generated by the testcase generator (124), which generates the testcases (125) in accordance with one or more parameters specified in the testcase definition file (123). The testcase generator (124) suitably generates a relatively large number of testcases biased according to parameters stored in the testcase definition file (123). The testcase definition file (123) causes the testcase generator (124) to generate non-random testcases. According to one embodiment of the present system, the testcase generator (124) generates testcases (125) that are more likely to test specific behavior of the processor under development as specified by the parameters in the testcase definition file (123). If no testcase definition file (123) is present, the testcase generator (124) would generate truly random testcases (125).

The microarchitecture models (126) illustrated in FIG. 1 are a collection of low-level models that describe possible behavior of the processor under development. The term "microarchitecture models" as used herein refers to any type of model that may represent the possible behaviors of an integrated circuit such as a processor under development. Preferably, the microarchitecture models (126) specify detailed behavior of the processor under development at a lower level than traditional architectural models. The microarchitecture models (126) are used to produce the predicted final state of the processor under development's resources when processing a testcase.

The simulation model (127) illustrated in FIG. 1 is a model of the actual processor under development that is compiled from a high-level hardware description language such as Very High Speed Integrated Circuit (VHSIC) hardware Description Language (VHDL) or Verilog. More specifically, the simulation model (127) is a model of the processor under development in a format that can be interpreted by the gate level cycle simulator (128), which applies the testcases (125) to the simulation model (127) to determine whether the simulated processor under development behaves as expected. The test coverage evaluation and adjustment mechanism (129) is used to compare the results of running testcases (125) on the simulation model (127) to the microarchitecture models (126) thereby searching for resource deviations.

The processor (110) illustrated in FIG. 1 may be constructed from one or more microprocessors and/or integrated circuits, and may include multiple instruction pipelines that can execute instructions in parallel. The processor (110) executes program instructions that are both stored and accessed in the main memory (120). As illustrated in FIG. 1, the processor (110) includes a cache memory (115). The processor (110) may store data in the cache memory (115) thereby increasing processor speed. Processor speed is increased by the use of the cache memory (115) because the cache memory (115) is more readily available than regular random access memory (RAM). The cache memory (115) illustrated in FIG. 1 is a level 1 (L1) cache memory meaning it is located on the processor itself. However, it is within the scope of the present processor testing system that the cache memory be L1 cache memory, L2 (level 2 cache memory that is located on a second chip such as an expansion card), or RAM. Although the computer system (100) illustrated in FIG. 1 shows a single processor and a single system bus, the present processor testing method and apparatus may be practiced using a computer system that incorporates multiple processors and/or multiple buses.

For ease of explanation only, the present processor testing apparatus has been, and will continue to be described in the context of a fully functional computer system. However, the present processor testing apparatus is capable of being distributed as a program product in a variety of forms (such as recordable type media and transmission type media). Additionally, the principles described herein apply equally regardless of the particular type of signal bearing media actually used to carry out the distribution.

Exemplary Implementation and Operation

Referring again to FIG. 1, the processor (110) of the computer system (100) is capable of testing the data sharing capabilities of a processor under development, whose characteristics are represented by a simulation model (127). More specifically, the present computer system (100) performs a method for identifying and incorporating data locations that may be shared among multiple testcase threads resulting in predictable final memory states. Predictability is difficult to ensure when performing data sharing operations because it is almost impossible to predict which thread will perform a memory access first. In order to maintain a predictable final state, two data sharing conditions should be avoided: first, a thread should not perform a write (store) function to a byte that another thread reads (loads); and second, two threads should not both write (store) to a single byte. According to one embodiment of the present computer system, the two data sharing conditions mentioned above have been simplified to a single condition located in the testcase definition file (123): do not store to any location that another testcase thread uses (either loads or stores).

While performing the above-mentioned condition that is located in the testcase definition file, a testcase generator is able to choose addresses and access sizes for testcase threads of code to perform false sharing, which is defined in the next paragraph, while maintaining a level of predictability. One embodiment of the present processor testing system is biased towards finding locations for stores (no previous thread has stored/loaded) before finding locations for loads (no previous thread has stored) because a location suitable for the performance of a store operation may also perform as a load location. Moreover, once a location is identified as a store or load location it is removed from the list of possible data sharing locations. The system may also be biased towards finding locations for larger loads or stores before smaller ones.

Figure 2A:
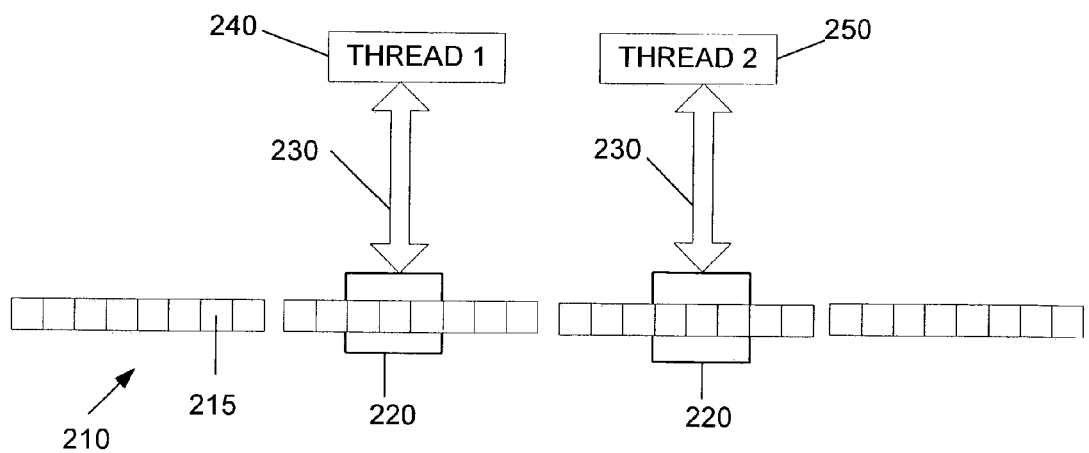
FIG. 2A illustrates false data sharing according to one embodiment.

By only storing to locations that are unused by another testcase thread of code, one embodiment of the present processor testing system is constrained to performing false data sharing configurations. FIG. 2A illustrates what is meant by the term "false data sharing configuration" according to one embodiment of the present processor testing system. As illustrated in FIG. 2A, when a testcase thread (240, 250) has been generated by a testcase generator, the testcase thread accesses a designated line of data. Once the data line is requested, the executing processor caches the line of data. A cached line of data (210) such as the one illustrated in FIG. 2A is comprised of a designated number of bits (215) of data. FIG. 2A illustrates a cached data line (210) of 32 bits, however, any number of bits may be cached within the scope of the present processor testing system. Data is shared when it is accessed (230) (either loaded or stored) by more than one thread (240, 250). When data is shared between two threads, the threads may be running on the same processor, on separate processor cores on the same chip, or even on separate processors in the same system. The only limitation to data sharing is that the threads have access to the same line of data. False sharing occurs when two threads access the same cached data line (210) but access different bytes of data (220) within the data line as illustrated in FIG. 2A.

Figure 2B:
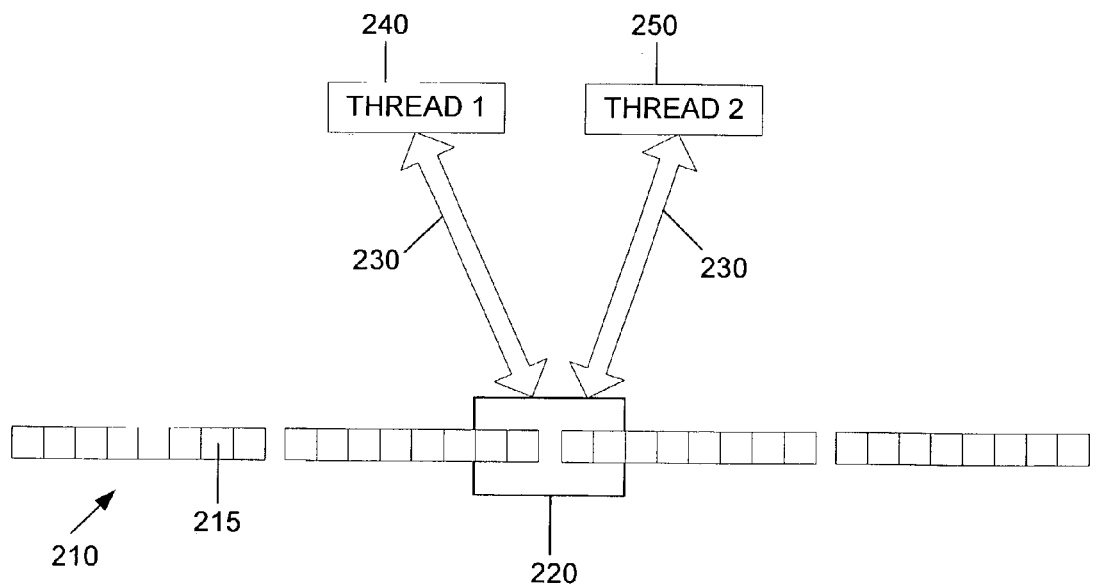
FIG. 2B illustrates true data sharing according to one embodiment.

True data sharing occurs when two or more threads (240, 250) access the same bytes of cached data (220) as illustrated in FIG. 2B. The present system will be described, for ease of explanation only, as being biased towards identifying possible false data sharing locations. However, it is within the scope of the present processor testing system to identify possible locations to perform true data sharing as well.

Figure 3:
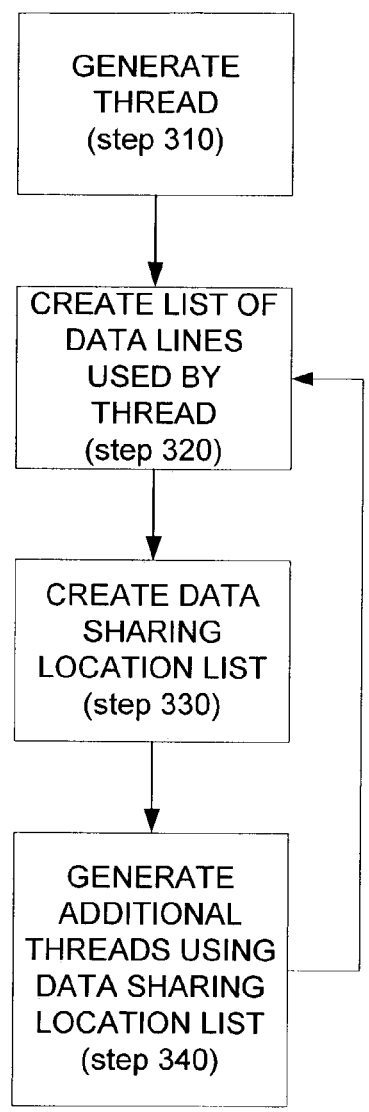
FIG. 3 is a flow chart illustrating a method for identifying predictable data sharing locations according to one representative embodiment.

FIG. 3 illustrates steps that may be performed by a testcase generator to test the data sharing capabilities of a processor under development according to one embodiment of the present processor testing system. As shown in FIG. 3, the testcase generator (124; FIG. 1) begins testing a processor under development by producing a testcase thread of code (step 310) for testing the functionality of the processor under development. Once the first thread is generated (step 310), a list of the data lines used by that thread is produced (step 320). The list of data lines used by each thread produced includes at least the address of the cache line where the data line is located, the bytes of the data line the generated thread stores, and the bytes of the data line the generated thread loads. This list of data lines used by the generated thread is then used to produce a list of possible data sharing locations (step 330). For each data line used, the testcase generator (124; FIG. 1) performs a test-and-check method to determine whether the data line may further be used as a data sharing location. Initially, a data sharing operation is chosen, and the data line is analyzed for compatibility with the chosen data sharing operation according to the conditions designated in the testcase definition file. If the data sharing operation selected can be performed safely (a false data sharing condition), then the information regarding the identified location in the data line is added to the list of possible data sharing locations (step 330). Each entry on the list of possible data sharing locations may include the address of the possible data sharing location, whether the possible operation is a load or store operation, and the number of bytes in the data line that are available for the possible operation. When the location and the operation available on the data line have been identified and recorded, the testcase generator continues the processor testing operation by generating additional testcase threads using the updated list of possible data sharing locations (step 340). The updated list of possible data sharing locations is used to select locations where the data sharing functionality of the processor under development can be tested in a predictable manner.

Figure 4:
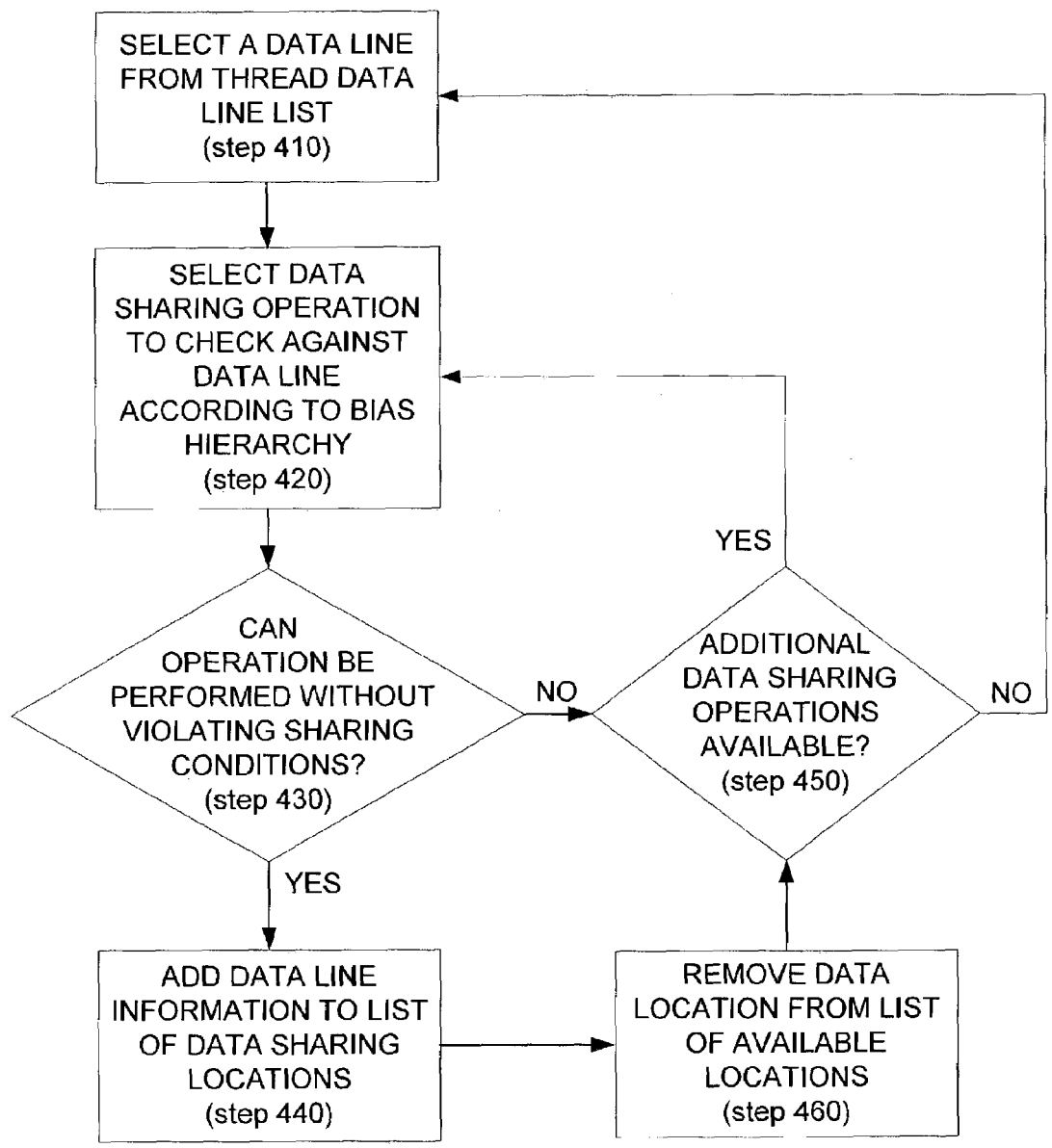
FIG. 4 is a flow chart illustrating a method for creating a data sharing location list according to one embodiment.

FIG. 4 further illustrates the test-and-check method used by the testcase generator to create the list of possible data sharing locations (step 330; FIG. 3). Creating the list of possible data sharing locations begins as the testcase generator (124; FIG. 1) selects (step 410) a data line from the list of data lines used by the previously generated threads (step 320; FIG. 3). When the data line has been selected, the testcase generator selects a data sharing operation to be checked against the selected data line (step 420). Since all the data lines in the list of data lines used by the previously generated threads have at least one operation being performed on them, any additional operations that can be performed on the data line will cause data sharing to occur. The initial and subsequent potential data sharing operations to be checked against the data lines are selected according to a designated bias hierarchy (step 420) contained within the testcase definition file (123; FIG. 1).

Figure 5:
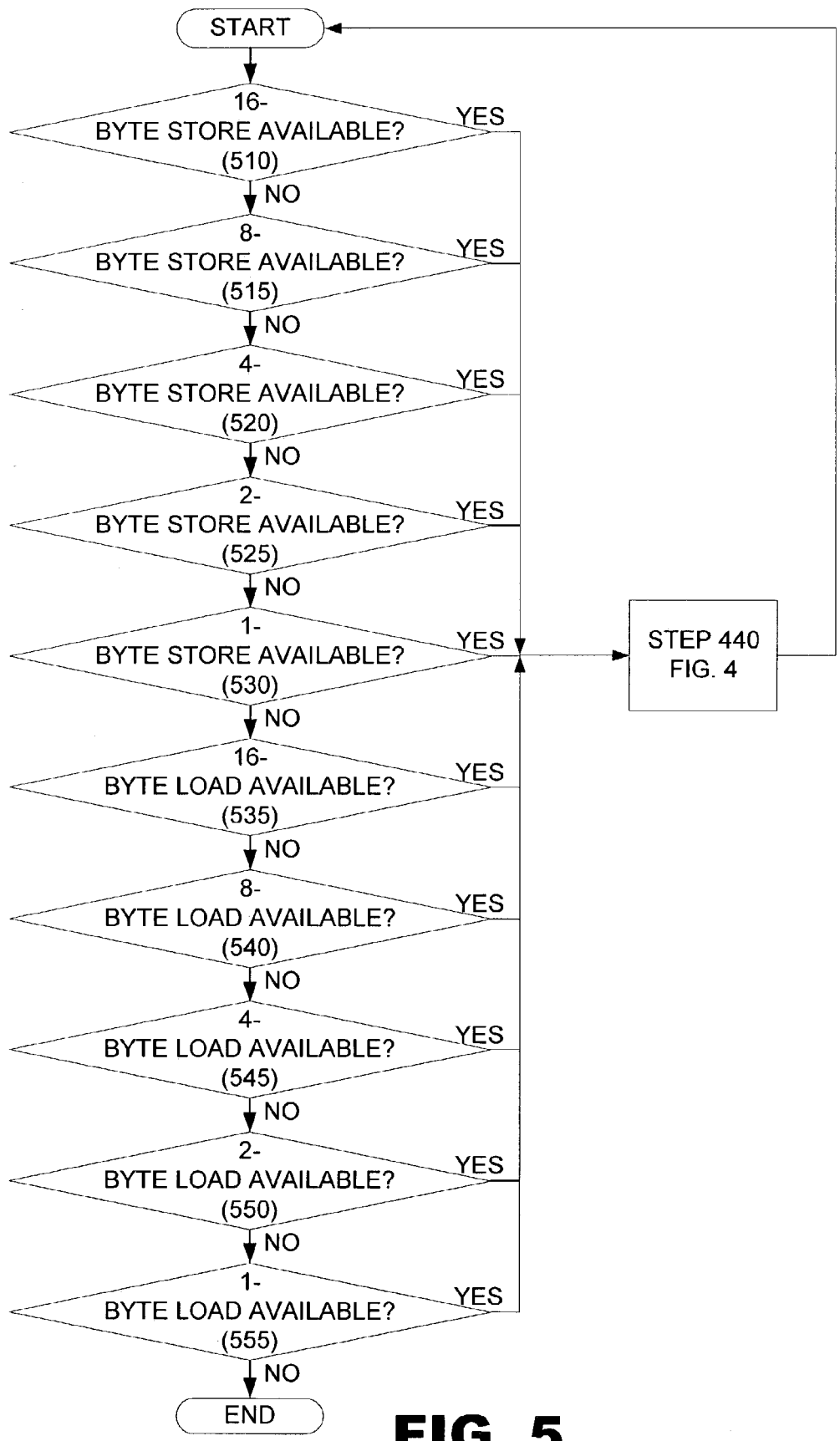
FIG. 5 is a flow chart illustrating a bias hierarchy decision algorithm according to one embodiment.

Once the initial data sharing operation has been selected (step 420) using the bias hierarchy illustrated in FIG. 5, the data line is checked for compatibility with the selected data sharing operation (step 430). If the selected data sharing operation (step 420) may be performed on the selected data line according to the data sharing conditions, then the data line information is added to the list of data sharing locations (step 440). Once the data line information has been added to the list of data sharing locations (step 440), the testcase generator inquires whether there are additional data sharing operations available according to the bias hierarchy (step 450). If there are additional data sharing operations available according to the bias hierarchy, then the testcase generator continues selecting and checking additional data sharing operations until the bias hierarchy is exhausted. Once there are no additional data sharing operations to be checked on the selected data line, the testcase generator selects a new data line from the thread data line list (step 410) and begins the checking process again.

If the initial data sharing operation (step 420) selected cannot be performed on the selected data line without violating the data sharing conditions (step 430), the testcase generator determines whether there are additional data sharing operations that have not been checked against the current data line according to the bias hierarchy (step 450). If there are additional data sharing operations available according to the bias hierarchy, the testcase generator selects and checks the additional data sharing operations as indicated by the bias hierarchy (step 420). However, if there are no additional data sharing operations available to be checked, the testcase generator selects a new data line from thread data line list (step 410) and begins checking the new data line for data sharing locations. According to the process illustrated in FIG. 4, if a selected operation cannot be performed without violating the data sharing conditions, another operation is chosen and tested until either an appropriate operation is found or all possible operations are checked and fail.

FIG. 5 illustrates one embodiment of the operation selection bias hierarchy used by the testcase generator in identifying potential data sharing locations. The operation selection is biased towards performing operations for which it may be more difficult to find possible locations. In general: store operations are attempted before load operations because any location to which a store may be done may also be an appropriate location for a load operation. The opposite, however, is not true. If data locations are checked for loads first, all possible store locations will first be identified as load locations and no store locations will be available. Additionally, larger byte operations are attempted before smaller byte operations. The example bias hierarchy illustrated in FIG. 5 demonstrates applying the data sharing bias to a processor capable of storing data lines of 32-bytes. However, it is possible to apply the data sharing bias to processors capable of storing data lines of any size. As illustrated in FIG. 5, a 32-byte processor may support operations of 1, 2, 4, 8, and 16-bytes.

The data sharing bias illustrated in FIG. 5 begins by attempting large operations first as indicated by step (510). Larger operations are attempted first, because a location that supports a large operation may also support any operation of a smaller number of bytes. If the smallest operation were checked first, every available data location would be taken by small operations and no larger data operations could be performed or tested. According to the 32-byte hierarchy, the testcase generator initially checks the selected data line for a location where 16-bytes of store data operation may be performed (510). A store can only take place on a byte that has not been loaded or stored by any other thread. If an available location is found, the data corresponding to the location, size, and operation available is sent to the list of possible data sharing locations (step 340; FIG. 3) and the identified location is removed from the list of available locations to be searched (step 460; FIG. 4). When an available data sharing location has been found and has been added to the list of data sharing locations (step 440; FIG. 4), the testcase generator determines whether the data line has been checked for every potential data sharing size and operation (step 450; FIG. 4). If every operation and size has not been checked according to the bias hierarchy, the checking process continues. If the entire data line has been checked and a location for an operation of 16-bytes of store has not been located, the hierarchy dictates that the testcase generator continue by checking for locations where 8-bytes of store operation may be performed (515). The check cycle continues by checking for 4-byte store locations (520), 2-byte store locations (525), and 1-byte store locations (530).

When the testcase generator has determined that there are no remaining store locations available according to the bias hierarchy conditions, the testcase generator begins to check the selected data line for possible load locations. Loads can take place on any bytes that have not been stored by any other thread. Again the testcase generator begins checking for large operations first. The order illustrated in FIG. 5 begins checking for 16-byte load locations (535), 8-byte load locations (540), 4-byte load locations (545), 2-byte load locations (550), and 1-byte load locations (555). Once the testcase generator has gone through the entire bias hierarchy without detecting a potential data sharing location, the testcase generator selects a new data line and begins the process again (step 410; FIG. 4).

Figure 6:
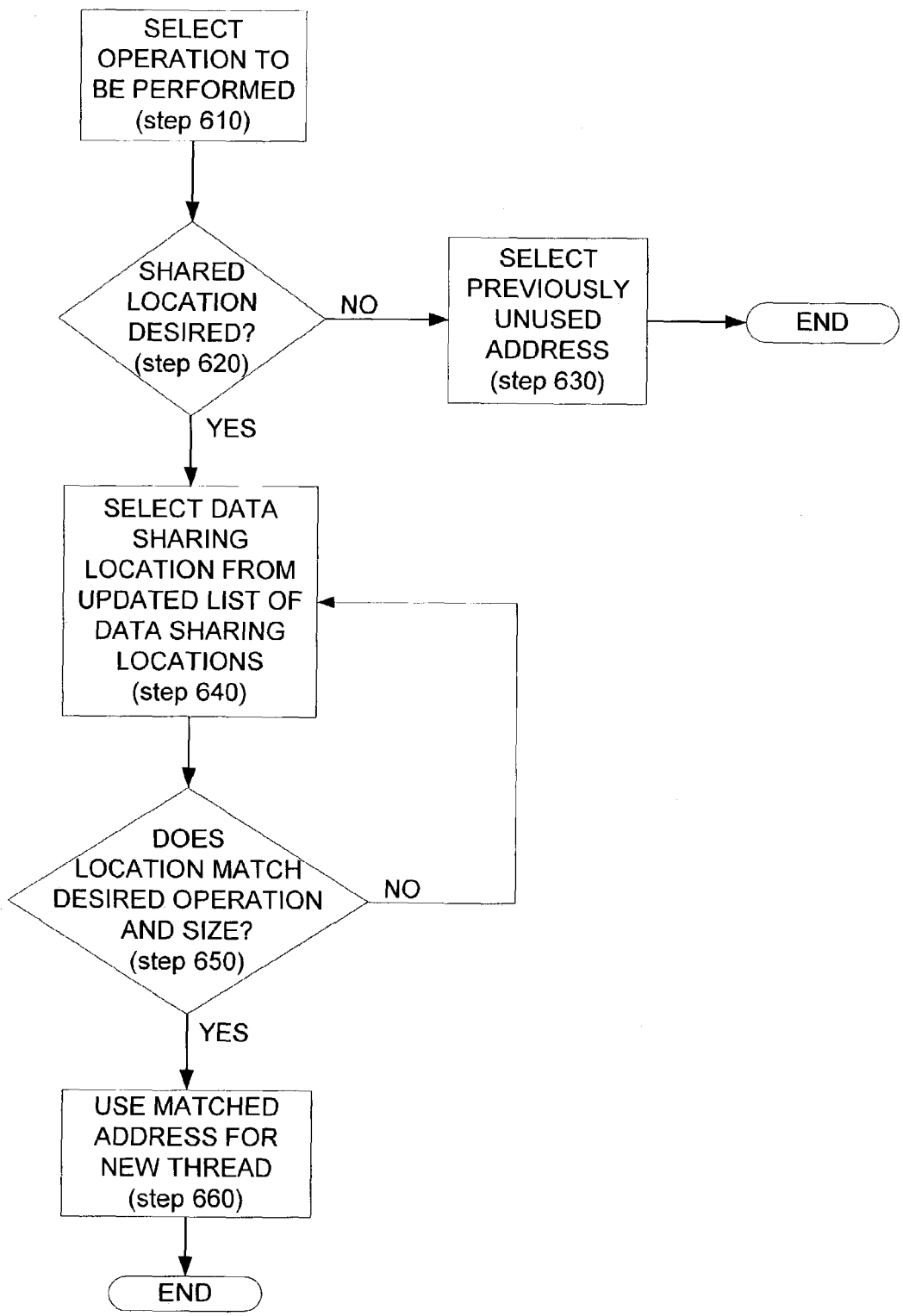
FIG. 6 is a flow chart illustrating a method for generating subsequent threads according to one embodiment.

When one or more data lines have been checked for possible data sharing locations, the testcase generator may use the generated list of possible data sharing locations from those lines to generate subsequent testcase threads. FIG. 6 illustrates one embodiment of a thread location selection process performed by the testcase generator when selecting a data location for a generated testcase thread. As illustrated in FIG. 6, the testcase generator begins by selecting a desired operation to be tested on the processor under development (step 610). The testcase generator will either perform a load operation or a store operation. When the operation to be performed has been selected, the processor determines whether the testcase generator desires to test a shared location or not (step 620). Both the selection of the desired operation and the determination of whether shared or unshared data locations are preferred may occur in any order and may either be randomly selected, selected according to a test schedule, or manually entered by a user.

If a shared location is not desired, the processor may select a previously unused data address (step 630) to assure that no data sharing will occur. However, if the testcase generator desires to test the data sharing capabilities of the processor under design, then a data sharing location may be selected from the list of available data sharing locations (step 640). When a data sharing location is selected (step 640), the processor determines whether the selected data sharing location matches the operation and size of the process desired by the testcase generator (step 650). If the selected data sharing location does not match the operation and/or size of the process desired by the testcase generator then the processor selects a new data sharing location from the updated list of data sharing locations (step 640). When a suitable data sharing location is found, the testcase generator uses the matched data address for the desired testcase thread (step 660) and the testcase is performed. When choosing a data sharing location (from the updated list of data sharing locations), the first suitable location that is identified in the list is used. However, any number of methods may be used in choosing a suitable location without straying from the scope of the present processor testing system.

According to one embodiment of the processor testing system, only aligned addresses are permitted for load and store operations. To be "aligned", an address must be evenly divisible by the size of the operation to be performed. By way of example, for a 16-byte operation to be performed, the address must be evenly divisible by 16. For a 2-byte operation, the address must be evenly divisible by 2, etc. However, it is possible to apply the biased identification method to systems where alignment is not required.

In conclusion, the methods and systems described herein allow for the identification and incorporation of available data line locations for predictable data sharing. Specifically, a biased search hierarchy is used to identify available false data sharing locations that are useful for processor testing. By testing the data sharing capabilities of processors and other integrated circuits, both predictability and reliability of the processor under development are enhanced.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method for identifying predictable data sharing locations comprising:
   generating a testcase thread of code;
   creating a list of data lines used by said generated testcase thread of code; and
   generating a list of predictable data sharing locations available for testing data sharing capabilities of an integrated circuit, said list of predictable data sharing locations being generated based on said list of data lines used by said generated testcase thread of code;
   wherein said step of generating said list of predictable data sharing locations based on said list of data lines comprises:
   selecting a data line from said list of data lines used by said generated thread; and
   analyzing said data line for possible data sharing locations based on a bias hierarchy including checking for larger data sharing locations prior to checking for smaller data sharing locations.

2. A method for identifying predictable data sharing locations comprising:
   generating a testcase thread of code;
   creating a list of data lines used by said generated testcase thread of code; and
   generating a list of predictable data sharing locations based on said list of data lines used by said generated testcase thread of code;
   wherein said step of generating a list of predictable data sharing locations based on said list of data lines comprises:
   selecting a data line from said list of data lines used by said generated thread; and
   analyzing said data line for possible data sharing locations based on a bias hierarchy;
   wherein said bias hierarchy comprises:
   initially checking said data line for false data sharing store locations; and
   checking said data line for false data sharing load operations after said false data sharing store locations have been identified.

3. The method for identifying predictable data sharing locations of claim 2, wherein said bias hierarchy further comprises checking for larger data sharing locations prior to checking for smaller data sharing locations.

4. The method for identifying predictable data sharing locations of claim 3, wherein said method comprises instructions located in a testcase definition file.

5. A method for testing the data sharing capabilities of a processor under development comprising:
   selecting a test operation to be performed on said processor under development, said test operation being selected in accordance with a bias hierarchy specifying selecting false data sharing store operations prior to selecting false data sharing load operations;
   selecting a data sharing location from a list of false data sharing locations available for testing the data sharing capabilities of said processor under development;
   forming a testcase thread of code based on said selected test operation and said selected data sharing location; and
   using said testcase thread of code to test the data sharing capabilities of said processor under development.

6. The method for testing the data sharing capabilities of a processor under development of claim 5, wherein said using step comprises:
   applying said testcase thread of code to a simulated model of said processor under development;
   applying said testcase thread to a microarchitecture model that defines the behavior of said processor under development; and
   comparing the results of applying said testcase thread of code to said simulation model of said integrated circuit design to the results of applying said testcase thread of code to said microarchitecture model.

7. The method of claim 6, wherein said method further comprises:
   if said comparing results of said simulation model and said microarchitecture model result in different results, debugging said processor under development.

8. A method for testing the data sharing capabilities of a processor under development comprising:
   selecting a test operation to be performed on said processor under development;
   selecting a data sharing location from a list of available false data sharing locations; and
   forming a testcase thread of code based on said selected operation and said selected data sharing location;
   wherein said selecting a data sharing location from a list of available false data sharing locations comprises:
   selecting a first identified data sharing location from a list of possible data sharing locations;
   checking said data sharing location for compatibility with operation and size of said selected operation; and
   if selected identified data sharing location does not match the operation and size of said selected operation, selecting a second identified data sharing location from said list of possible data sharing locations.

9. The method of claim 8, wherein a computer performs said method.

10. An apparatus for testing the correct behavior of an integrated circuit comprising:
    a processor;
    a memory storage unit; and
    a bus communicatively coupling said processor and said memory storage unit;
    wherein said memory storage unit includes a machine readable medium having instructions thereon for causing said apparatus to identify predictable data sharing locations available for testing the data sharing capabilities of said integrated circuit;
    wherein said identifying of said predictable data sharing locations available for testing the data sharing capabilities of said integrated circuit comprises a biased checking for larger data sharing locations prior to checking for smaller data sharing locations.

11. The apparatus for testing the correct behavior of an integrated circuit of claim 10, wherein said integrated circuit comprises a processor under development.

12. An apparatus for testing the correct behavior of an integrated circuit comprising:
    a processor;
    a memory storage unit; and
    a bus communicatively coupling said processor and said memory storage unit;
    wherein said memory storage unit includes a machine readable medium having instructions thereon for causing said apparatus to identify predictable data sharing locations available for testing the data sharing capabilities of said integrated circuit, said integrated circuit comprising a processor under development;

wherein said identifying of locations to test the data sharing capabilities of said processor under development comprises a bias based check method;

wherein said bias based check method comprises:

initially checking a data line for false data sharing store locations; and checking said data line for false data sharing load operations after said false data sharing store locations have been identified.

13. The apparatus for testing the correct behavior of an integrated circuit of claim 12, wherein said bias based check method further comprises checking for larger data sharing locations prior to checking for smaller data sharing locations.

14. The apparatus for testing the correct behavior of an integrated circuit of claim 12, wherein identifying locations to test the data sharing capabilities of said processor under development further comprises:

generating a testcase thread of code;

creating a list of data lines used by said generated testcase thread of code; and generating a list of predictable data sharing locations based on said list of data lines used by said generated testcase thread of code.

15. The apparatus for testing the correct behavior of an integrated circuit of claim 14, wherein said apparatus generates additional testcase threads of code that perform predictable false data sharing based on said generated list of predictable data sharing locations.

16. A testcase generator capable of testing the data sharing capabilities of an integrated circuit comprising:

a processor;

a memory storage structure; and a bus communicatively coupling said processor and said memory;

wherein said memory storage structure contains a machine readable medium having instructions thereon for causing said apparatus to identify predictable data sharing locations available for testing the data sharing capabilities of said integrated circuit;

wherein said identifying of said predictable data sharing locations available for testing the data sharing capabilities of said integrated circuit comprises a biased checking for at least one false data sharing store location before checking for a false data sharing load location.

17. The testcase generator of claim 16, wherein said testcase generator generates one or more data sharing testcases using said predictable data sharing locations.

18. An apparatus for testing the correct behavior of an integrated circuit comprising:

computer processing means;

memory means for storing data; and communications means for communicatively coupling said processing means and said memory means;

wherein said memory means includes a machine readable medium having instructions thereon for causing said apparatus to identify predictable false data sharing locations available for testing the data sharing capabilities of said integrated circuit;

wherein said identifying of said predictable data sharing locations available for testing the data sharing capabilities of said integrated circuit comprises a biased checking for at least one false data sharing store location before checking for a false data sharing load location.

19. The apparatus of claim 18, wherein said processing means further comprises a cache memory.

20. The apparatus of claim 19, wherein said memory means further comprises instructions for causing said computer processing means to function as a testcase generator.

21. The apparatus of claim 20, wherein said computer processing means, when functioning as a testcase generator, generates testcases that test the data sharing functionality of said integrated circuit using said predictable false data sharing locations.

22. A computer readable program product comprising:

a data sharing processor evaluation mechanism that when executed by a processor generates a testcase thread of code, creates a list of data lines used by said generated testcase thread of code, and generates a list of predictable data sharing locations based on said data line list and a bias hierarchy including checking for false data sharing store locations prior to checking for false data sharing load locations, wherein said list of predictable data sharing locations are available for use by a testcase generator to produce predictable data sharing testcases; and computer readable signal bearing media bearing said test coverage evaluation and adjustment mechanism.

23. The computer readable program product of claim 22, wherein said signal bearing media comprises recordable media.

24. The computer readable program product of claim 22, wherein the signal bearing media comprises transmission media.

25. The method for identifying predictable data sharing locations of claim 1, wherein said list of predictable data sharing locations includes data representative of bytes within said data lines that are not used by said generated testcase thread of code.

* * * * *